US012534954B2

(12) United States Patent
Saito et al.

(10) Patent No.: US 12,534,954 B2
(45) Date of Patent: Jan. 27, 2026

(54) TRANSPORT FACILITY

(71) Applicant: Daifuku Co., Ltd., Osaka (JP)

(72) Inventors: Marika Saito, Hinocho (JP); Kouichi Iida, Hinocho (JP); Takafumi Yamazaki, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 155 days.

(21) Appl. No.: 18/599,376

(22) Filed: Mar. 8, 2024

(65) Prior Publication Data

US 2024/0301747 A1 Sep. 12, 2024

(30) Foreign Application Priority Data

Mar. 9, 2023 (JP) ................................ 2023-036688

(51) Int. Cl.
*E06B 5/16* (2006.01)

(52) U.S. Cl.
CPC .................................... *E06B 5/16* (2013.01)

(58) Field of Classification Search
CPC . E06B 5/16; E06B 5/161; E06B 5/164; E06B 5/167; E05Y 2900/134; A62C 2/18; A62C 2/22
See application file for complete search history.

(56) References Cited

U.S. PATENT DOCUMENTS

| | | | | |
|---|---|---|---|---|
| 5,782,690 A * | 7/1998 | Gustafson | ................ | A62C 2/18 160/1 |
| 2013/0227891 A1* | 9/2013 | Cox | .......................... | E05C 3/12 49/394 |
| 2016/0340966 A1* | 11/2016 | Hosaka | ................... | E06B 5/167 |
| 2018/0347263 A1* | 12/2018 | Kawabe | .............. | E05D 15/0691 |
| 2024/0216724 A1* | 7/2024 | Yoon | ........................ | A62C 2/22 |

FOREIGN PATENT DOCUMENTS

| | | | | |
|---|---|---|---|---|
| JP | 6286286 A | 4/1987 | | |
| JP | 2006282140 A | 10/2006 | | |
| WO | WO-8302234 A1 * | 7/1983 | .............. | A62C 2/22 |

* cited by examiner

*Primary Examiner* — Christine T Cajilig
(74) *Attorney, Agent, or Firm* — The Webb Law Firm

(57) ABSTRACT

A transport facility includes a guide rail which is disposed along a travel path extending in a travel direction through an opening of a wall and which is configured to guide traveling of a transport vehicle, and a fire door configured to open and close the opening. The fire door is configured to, in closing the opening, move toward a first side in an arrangement direction from an open position to a closed position. The fire door includes a notch penetrating the fire door in the travel direction and open on the first side to prevent the fire door from coming into contact with the first rail body and the second rail body while the fire door is moving from the open position to the closed position.

7 Claims, 5 Drawing Sheets

10
20
21
30
31
31a
32
32a
33
35
37
37a
37b
18
40,P12
41
42
43
45
47
47a
47b
50,P22
51
52
53
55
61
62
70
Y
Y1
Y2
Z

TRANSPORT FACILITY

CROSS-REFERENCE TO RELATED APPLICATION

This application claims priority to Japanese Patent Application No. 2023-036688 filed Mar. 9, 2023, the disclosure of which is hereby incorporated by reference in its entirety.

BACKGROUND OF THE INVENTION

1. Field of the Invention

The present invention relates to a transport facility including a fire door and a guide rail.

2. Description of Related Art

There has been known a transport facility including a fire door and a guide rail. Japanese Unexamined Patent Application Publication No. 62-086286 (Patent Literature 1) discloses a transport facility including guide rails with respective cut portions, and a fire door passes the cut portions at the time when fire occurs.

At the time when a transport vehicle passes the cut portions of the guide rails, there is such a problem that vibrations easily occur. In the transport facility of Patent Literature 1, the fire door is disposed to diagonally cross two guide rails so as to prevent wheels of the transport vehicle from passing respective cut portions of the two guide rails at the same time, thereby reducing vibrations at the time when the transport vehicle passes the cut portions of the guide rails. However, since the wheels of the transport vehicle pass the cut portions of the guide rails anyway, vibrations still occur when the wheels pass the cut portions. Accordingly, there is room for improvement in terms of protection of a transport target by the transport vehicle or stability of traveling of the transport vehicle.

SUMMARY OF THE INVENTION

In view of the foregoing, it is desired to achieve a transport facility that can restrain vibrations of a transport vehicle at the time when the transport vehicle travels at a fire-door installation area.

A transport facility according to this disclosure is a transport facility including a guide rail which is disposed along a travel path extending in a travel direction through an opening of a wall and which is configured to guide traveling of a transport vehicle, and a fire door configured to open and close the opening. The guide rail includes a first rail body and a second rail body away from each other horizontally in an arrangement direction. The fire door is configured to, in closing the opening, move toward a first side in the arrangement direction along a wall surface of the wall from an open position, at which the opening is opened, to a closed position, at which the fire door closes the opening. The fire door includes: an upper closing section configured to close a region of the opening above the first rail body and the second rail body while the fire door is at the closed position; a lower closing section configured to close a region of the opening below the first rail body and the second rail body while the fire door is at the closed position; a connecting section disposed on a second side in the arrangement direction relative to the first rail body and the second rail body and configured to connect the upper closing section with the lower closing section in an up-down direction; and a notch defined by the upper closing section, the lower closing section, and the connecting section. The notch penetrates the fire door in the travel direction and is open on the first side to prevent the fire door from coming into contact with the first rail body and the second rail body while the fire door is moving from the open position to the closed position.

In this configuration, in a case where the guide rail includes the first rail body and the second rail body away from each other in the horizontal direction, while the fire door is disposed at the closed position, regions above and below the first rail body and the second rail body and a region on the second side relative to the first rail body and the second rail body can be closed by the fire door. Further, travel faces of the first rail body and the second rail body on which the transport vehicle travels can be seamlessly continuous in the travel direction. This accordingly easily restrains vibrations of the transport vehicle at the time when the transport vehicle travels. Further, since the notch of the fire door is open on the first side to prevent the fire door from coming into contact with the first rail body and the second rail body while the fire door is moving, the fire door can be closed suitably. Further, since the fire door moves in the arrangement direction of the first rail body and the second rail body along the wall surface of the wall, it is possible to avoid the first rail body and the second rail body from coming into contact with the fire door and to easily reduce the width of the notch in a direction perpendicular to the moving direction of the fire door. Thus, it is possible to reduce a gap between the fire door and the guide rail.

DESCRIPTION OF THE INVENTION

An embodiment of a transport facility 10 will be described below with reference to the drawings.

Figure 1:
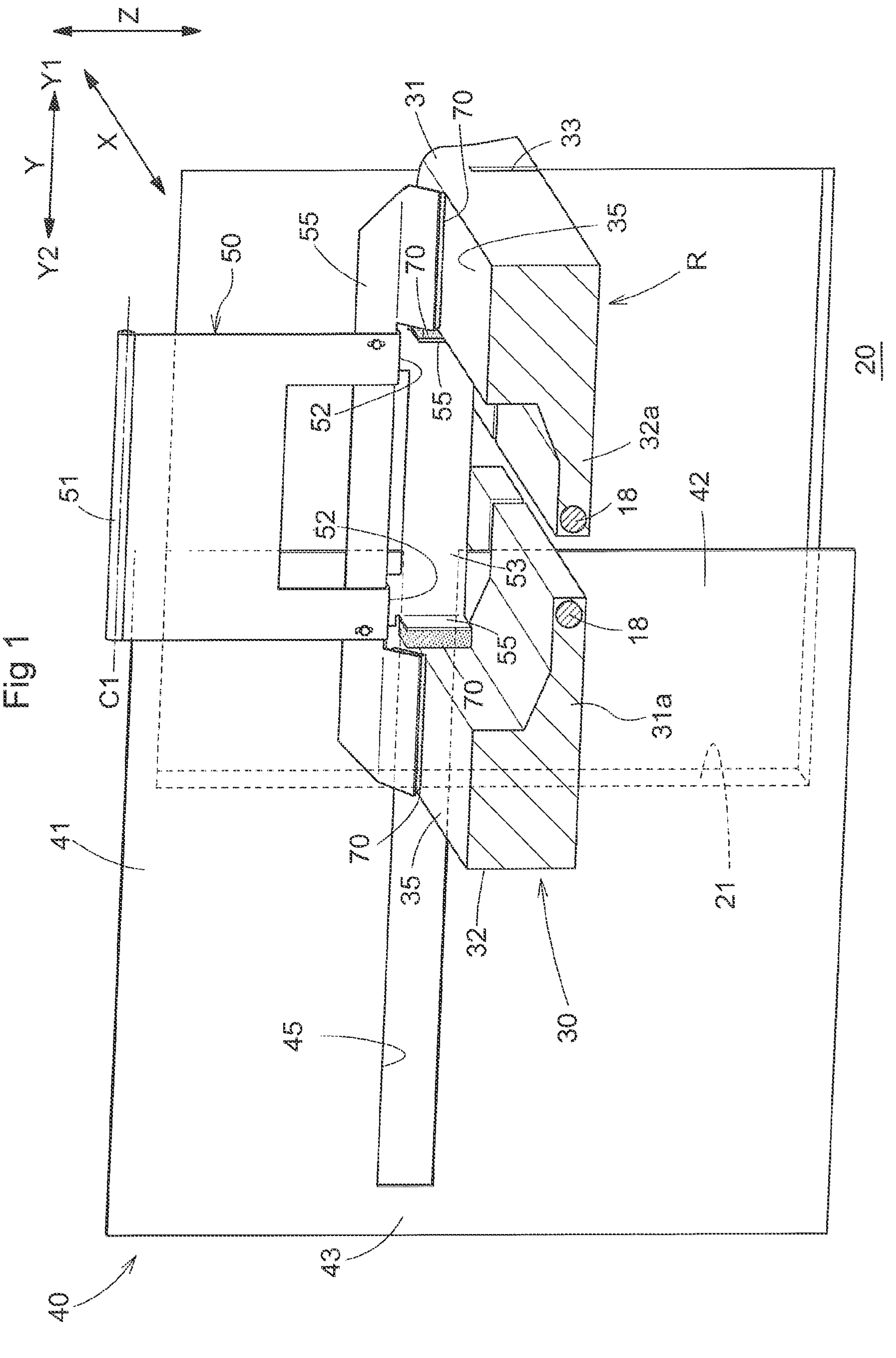
FIG. 1 is a perspective view of a transport vehicle according to the present embodiment.

FIG. 1 is a perspective view of the transport facility 10 according to the present embodiment. The transport facility 10 includes a guide rail 30 disposed along a travel path R passing through an opening 21 formed in a wall 20, and a fire door 40 opening and closing the opening 21 formed in the wall 20. In the present embodiment, the transport facility 10 further includes an auxiliary door 50 closing the opening 21 together with the fire door 40.

The guide rail 30 is disposed along the travel path R and guides traveling of a transport vehicle 11 (described later). Further, the guide rail 30 includes a first rail body 31 and a second rail body 32 provided away from each other in a horizontal direction. In the present embodiment, the first rail body 31 and the second rail body 32 are seamlessly continuous in a travel direction X relative to the fire door 40.

Here, the travel direction X is defined as a direction along the travel path R. Further, an arrangement direction Y is defined as a direction where the first rail body 31 and the second rail body 32 are arranged. Further, a first side Y1 is defined as one side in the arrangement direction Y, and a second side Y2 is defined as the other side in the arrangement direction Y. In the present embodiment, the arrangement direction Y is along a horizontal direction. Further, an up-down direction Z is defined as a direction along a vertical direction.

Figure 2:
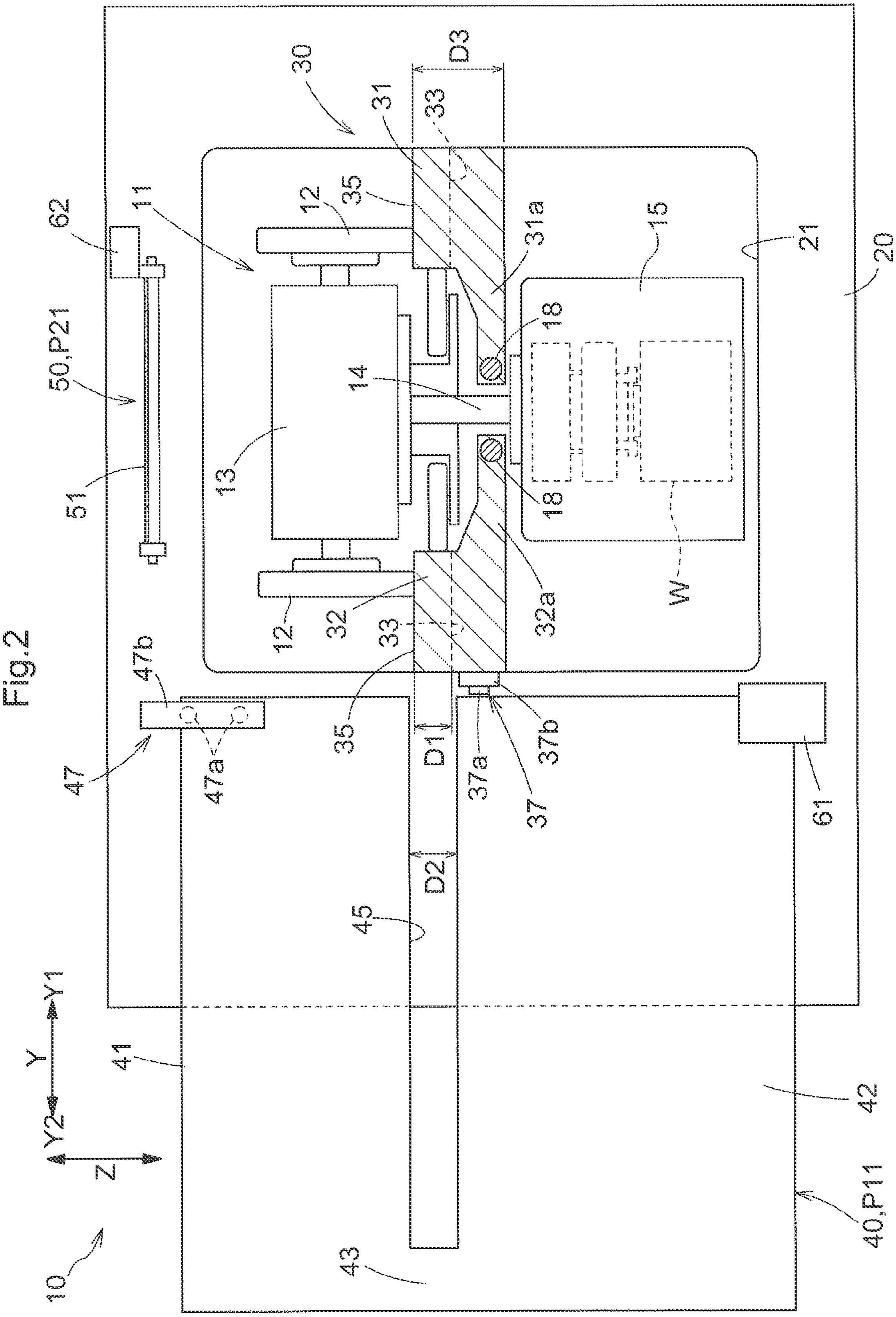
FIG. 2 is a view illustrating a state where a fire door and an auxiliary door in the transport facility in FIG. 1 are opened.
Figure 3:
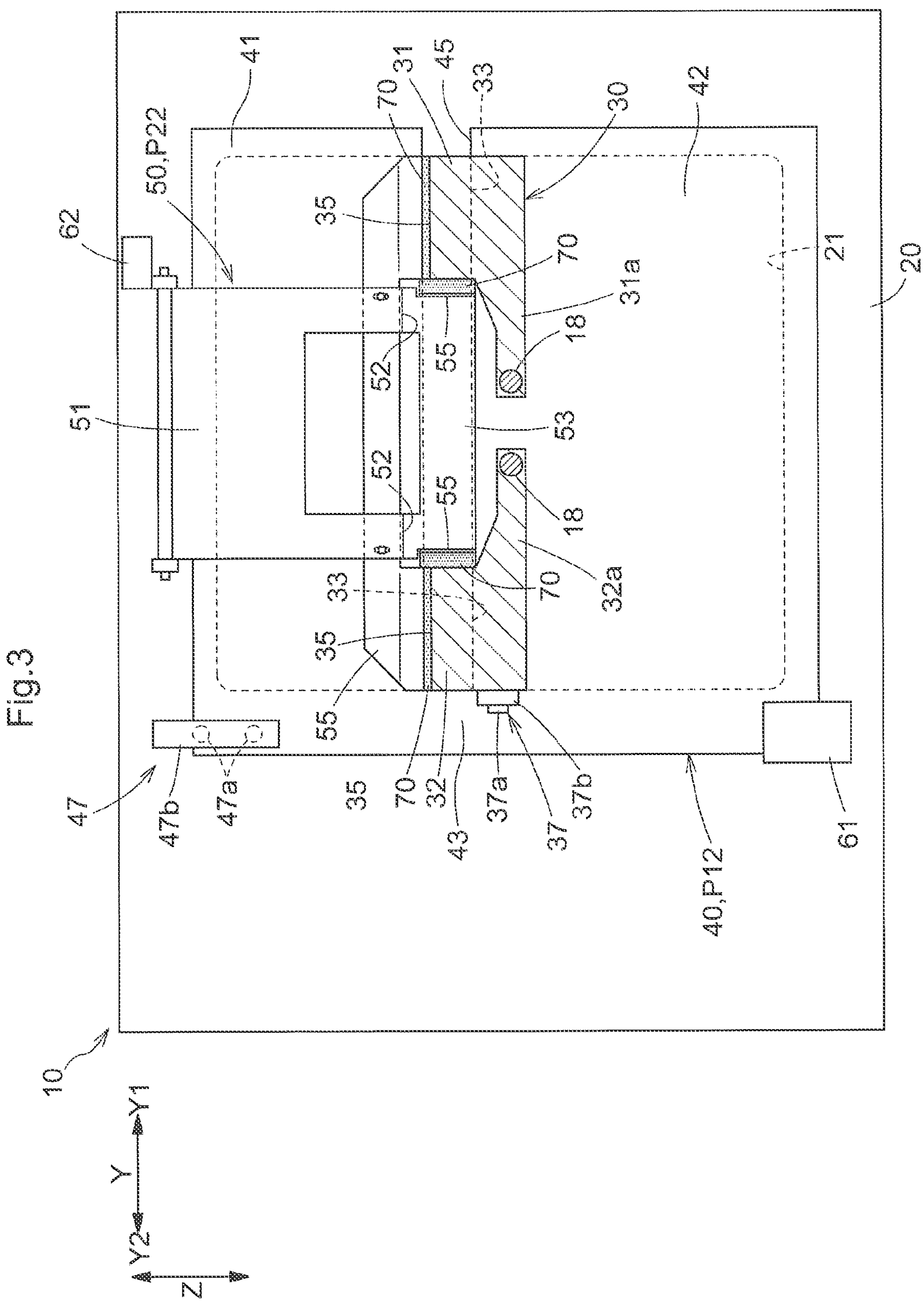
FIG. 3 is a view illustrating a state where the fire door and the auxiliary door in the transport facility in FIG. 1 are closed.

FIG. 2 is a front view of the transport facility 10 with the fire door 40 being opened. FIG. 3 is a front view of the transport facility 10 with the fire door 40 being closed. As illustrated in FIG. 2, in the present embodiment, the transport vehicle 11 includes a travel section 13 including a wheel 12, and a storage section 15 in which a transport article W is stored. In the example illustrated herein, the storage section 15 is disposed below the travel section 13. In the present embodiment, a power reception section 14 is disposed between the travel section 13 and the storage section 15. The transport vehicle 11 includes the power reception section 14 receiving electric power from a feeder cable 18. The transport vehicle 11 has one pair of wheels 12 or two or more pairs of wheels 12.

In the present embodiment, the transport vehicle 11 is an overhead transport vehicle. The transport vehicle 11 is an electric unmanned transport vehicle. The transport article W transported by the transport vehicle 11 is not limited in particular, but the transport vehicle 11 transports an FOUP (Front Opening Unified Pod) containing a semiconductor substrate as the transport article W, for example. In the present embodiment, the transport facility 10 is provided in a clean room, for example.

Figure 4:
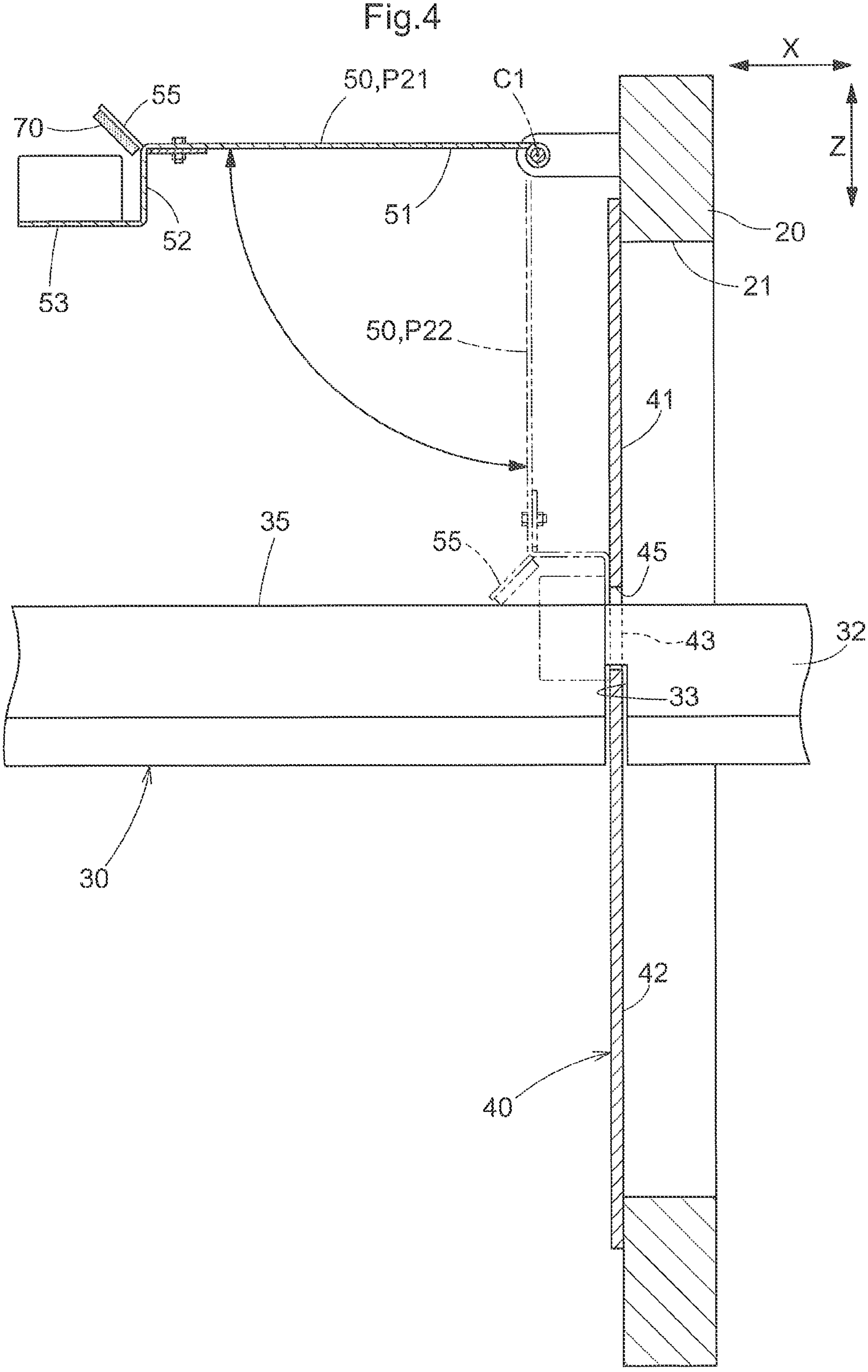
FIG. 4 is a sectional view of the transport facility in FIG. 1.

FIG. 4 is a view illustrating a section of the transport facility 10 along an X-Z plane passing between the first rail body 31 and the second rail body 32. In a case where the fire door 40 is to close the opening 21 from an open position P11 where the opening 21 is opened, the fire door 40 moves toward the first side Y1 along a wall surface of the wall 20 to reach a closed position P12. FIG. 1 illustrates the fire door 40 present between the open position P11 and the closed position P12. FIG. 2 illustrates the fire door 40 present at the open position P11, and FIG. 3 illustrates the fire door 40 present at the closed position P12.

As illustrated in FIG. 2, in the present embodiment, a top face of the first rail body 31 and a top face of the second rail body 32 serve as travel faces 35 where the wheels 12 of the transport vehicle 11 travel. The first rail body 31 and the second rail body 32 overlap with the fire door 40 at the closed position P12 as viewed in the up-down direction. In respective overlap regions where the first rail body 31 and the second rail body 32 overlap the fire door 40 at the closed position P12, the first rail body 31 and the second rail body 32 include respective grooves 33 extending in the arrangement direction Y and opened downward below the travel faces 35. In the present embodiment, the travel faces 35 are seamlessly continuous in the travel direction X over the grooves 33 in the travel direction X.

In the present embodiment, the grooves 33 are provided such that the fire door 40 disposed at the closed position P12 is partially disposed in the grooves 33. In the present embodiment, the transport facility 10 includes a roller mechanism 37 that guides the fire door 40 to the grooves 33 at the time when the fire door 40 moves from the open position P11 to the closed position P12. The roller mechanism 37 includes a pair of rollers **37*a* that rotates in contact with the fire door 40 from both sides in the travel direction X. The pair of rollers 37*a* has a rotation axis in a direction along the up-down direction Z and is supported by a roller support section 37*b* fixed to the guide rail 30. The roller mechanism 37 is omitted in FIGS. 1 and 4**.

In the present embodiment, a part where the groove 33 is formed in each of the first rail body 31 and the second rail body 32 is made of a material having a heat-resisting property higher than that of other parts of the first rail body 31 and the second rail body 32. The material for forming the part where the groove 33 is formed is a steel material with a high melting point, or the like. For example, in a case where each of the first rail body 31 and the second rail body 32 has a structure in which a plurality of rail portions is coupled with each other in the travel direction X, when a material for forming a rail portion (in other words, a rail portion where the groove 33 is formed) disposed to penetrate through the opening 21 is a material having a melting point higher than those of materials for forming other rail portions, the above configuration can be achieved. In the present embodiment, a feeder cable 18 and a feeder cable support **31*a*, 32*a* supporting the feeder cable 18 are provided in a lower part of each of the first rail body 31 and the second rail body 32. The feeder cable 18 supplies electric power to the power reception section 14 of the transport vehicle 11** in a contactless manner.

The fire door 40 includes an upper closing section 41 and a lower closing section 42. The upper closing section 41 closes a region of the opening 21 above the first rail body 31 and the second rail body 32 while the fire door 40 is disposed at the closed position P12. The lower closing section 42 closes a region of the opening 21 below the first rail body 31 and the second rail body 32 while the fire door 40 is disposed at the closed position P12. In the present embodiment, while the fire door 40 is disposed at the closed position P12, part of the lower closing section 42 is disposed in the grooves 33.

In the present embodiment, the fire door 40 includes a connecting section 43 disposed on the second side Y2 relative to the first rail body 31 and the second rail body 32 and connecting the upper closing section 41 with the lower closing section 42 in the up-down direction Z. The fire door 40 includes a notch 45 defined by the upper closing section 41, the lower closing section 42, and the connecting section 43. In the present embodiment, the upper closing section 41, the lower closing section 42, and the connecting section 43 are formed integrally.

In the present embodiment, the notch 45 penetrates the fire door 40 in the travel direction X and is opened on the first side Y1 such that the fire door 40 does not come into contact with the first rail body 31 and the second rail body 32 while the fire door 40 is moving from the open position P11 to the closed position P12.

As illustrated in FIGS. 2, 3, in the present embodiment, the fire door 40 is pressed by a plunger mechanism 47 fixed to the wall 20 from both sides in the travel direction X, at both the open position P11 and the closed position P12. The plunger mechanism 47 presses the fire door 40 from both sides in the travel direction X by a plunger **47*a* supported by a plunger support section 47*b* fixed to the wall 20 and a plunger (not illustrated) provided on the wall 20. This reduces backlash of the fire door 40 in the travel direction X, so that the fire door 40 is easy to be put in the grooves 33. In the present embodiment, the fire door 40 is supported by the wall 20. The dimension of the fire door 40 in the up-down direction Z is larger than the dimension of the opening 21 in the up-down direction Z. The dimension of the fire door 40 in the arrangement direction Y is larger than the dimension of the opening 21 in the arrangement direction Y. The plunger mechanism 47 is omitted in FIGS. 1 and 4**.

In the present embodiment, the notch 45 is formed in a band shape parallel to the arrangement direction Y. As illustrated in FIG. 2, a width D2 of the notch 45 in the up-down direction Z is set to be larger than a distance D1, in the up-down direction Z, between the top faces of the first rail body 31 and the second rail body 32 and ceiling faces of the grooves 33. The width D2 of the notch 45 in the up-down direction Z is set to be smaller than a distance D3, in the up-down direction Z, between the top faces of the first rail body 31 and the second rail body 32 and lower faces of the first rail body 31 and the second rail body 32. The ceiling faces of the grooves 33 are placed above the feeder cables 18 in a horizontal view.

As illustrated in FIG. 4, in the present embodiment, when the auxiliary door 50 moves to a different direction from the fire door 40, the auxiliary door 50 changes from an open posture P21 to a closed posture P22. When the auxiliary door 50 has the closed posture P22, the auxiliary door 50 closes a region of the notch 45 between the first rail body 31 and the second rail body 32 in the arrangement direction Y. FIG. 2 illustrates the auxiliary door 50 having the open posture P21, and FIG. 3 illustrates the auxiliary door 50 having the closed posture P22. In FIG. 4, the auxiliary door 50 in the open posture P21 is indicated by a continuous line, and the auxiliary door 50 in the closed posture P22 is indicated by an alternate long and two short dashes line.

In the present embodiment, the auxiliary door 50 is configured to swing around a swing axis C1 disposed along the wall surface of the wall 20 and the arrangement direction Y. The open posture P21 is a posture of the auxiliary door 50 along the travel direction X, and the closed posture P22 is a posture of the auxiliary door 50 along the wall surface of the wall 20. In the present embodiment, the auxiliary door 50 is supported by the wall 20.

As illustrated in FIG. 4, in the present embodiment, the auxiliary door 50 includes a base end 51 where the swing axis C1 is disposed, and a bent section 52 between the base end 51 and a distal end 53 such that the distal end 53 is closer to the fire door 40 than the base end 51 in the closed posture P22. When the auxiliary door 50 has the closed posture P22, the distal end 53 of the auxiliary door 50 closes the region of the notch 45 between the first rail body 31 and the second rail body 32 in the arrangement direction Y. With this configuration, even when the swing axis C1 is away from the fire door 40, a gap between the fire door 40 and the guide rail 30 can be reduced.

As illustrated in FIGS. 2 and 3, in the present embodiment, the transport facility 10 includes a first driving device 61 configured to close at least the fire door 40, and a second driving device 62 configured to close at least the auxiliary door 50. The second driving device 62 brings the auxiliary door 50 into the closed posture P22 at the same time as the first driving device 61 brings the fire door 40 into the closed position P12 or after the first driving device 61 brings the fire door 40 into the closed position P12. The first driving device 61 and the second driving device 62 may include respective storage batteries. Examples of the first driving device 61 and the second driving device 62 may be an electric machine, an air cylinder, a hydraulic device, and so on. The first driving device 61 and the second driving device 62 are omitted in FIGS. 1 and 4.

Figure 5:
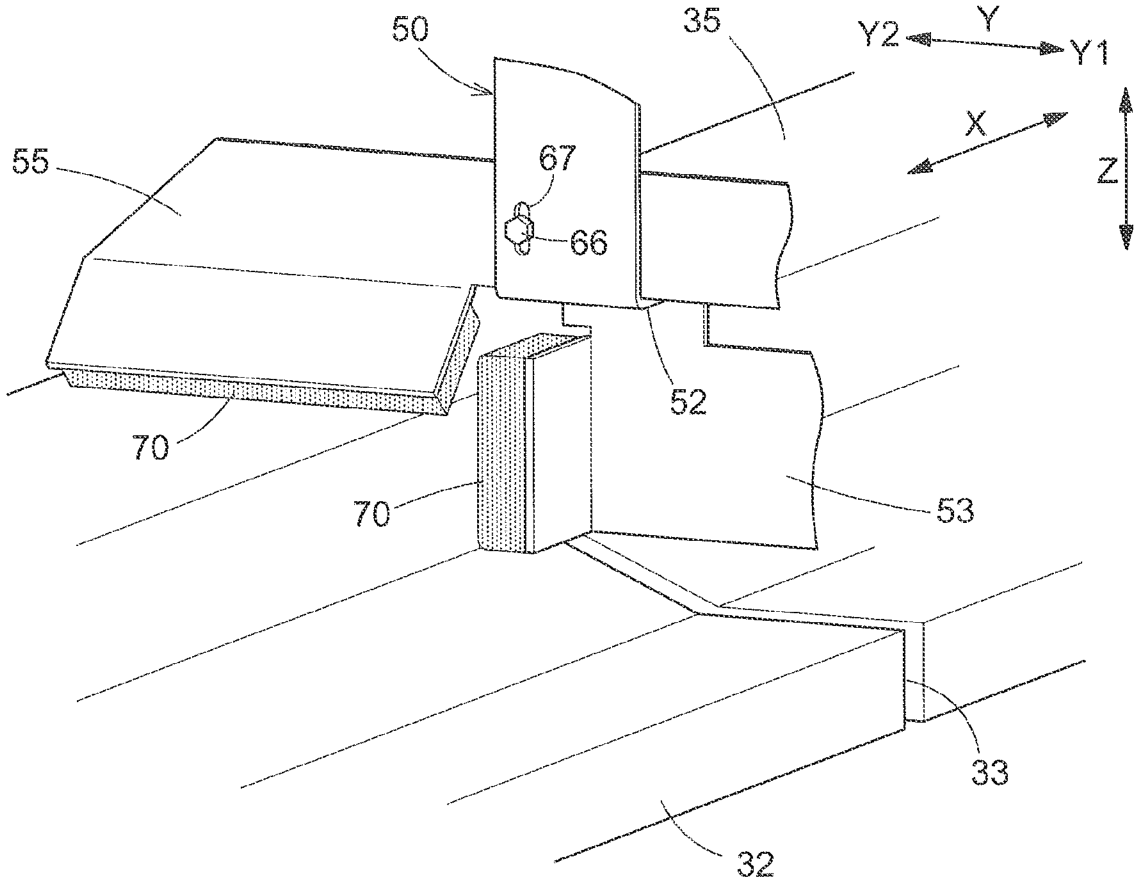
FIG. 5 is a perspective enlarged view of a heat insulation material attached to the auxiliary door in FIG. 1.

FIG. 5 is a perspective enlarged view of a lower part of the auxiliary door 50. In the present embodiment, a heat insulation material 70 that expands by heat of fire is attached to at least one of the guide rail 30, the fire door 40, and the auxiliary door 50. The heat insulation material 70 is disposed to stop at least one of a gap between the fire door 40 and the guide rail 30, a gap between the fire door 40 and the auxiliary door 50, and a gap between the auxiliary door 50 and the guide rail 30 when the heat insulation material 70 expands. For example, respective heat insulation materials 70 are attached to the fire door 40 and the auxiliary door 50 and disposed to stop the gap between the fire door 40 and the guide rail 30, the gap between the fire door 40 and the auxiliary door 50, and the gap between the auxiliary door 50 and the guide rail 30. Examples of a material for the heat insulation material 70 may be synthetic resin of epoxy base, butyl base, silicone base, or the like, rubber, and so on. The heat insulation material 70 stops those gaps at a temperature of 200° C. or more, for example. The heat insulation material 70 does not stop the gaps at a temperature of 100° C. or less, for example.

In the present embodiment, the auxiliary door 50 includes a support member 55 supporting the heat insulation materials 70 disposed to stop a gap between the top face of the first rail body 31 and the fire door 40 and a gap between the top face of the second rail body 32 and the fire door 40. The support member 55 can change its position in the up-down direction Z relative to the base end 51 of the auxiliary door 50 in the closed posture P22. In the example illustrated herein, the position of the support member 55 in the up-down direction Z is adjusted by a bolt 66 and an elongated hole 67.

In the present embodiment, a heat insulation material 70 disposed to stop a gap between the auxiliary door 50 and a lateral surface of the first rail body 31 which lateral surface faces the second rail body 32 in the arrangement direction Y is attached to the auxiliary door 50. Further, a heat insulation material 70 disposed to stop a gap between the auxiliary door 50 and a lateral surface of the second rail body 32 which lateral surface faces the first rail body 31 in the arrangement direction Y is attached to the auxiliary door 50. In the example illustrated in FIG. 5, the heat insulation materials 70 are attached to the distal end 53 of the auxiliary door 50.

With the transport facility 10 described above, the travel faces 35 of the first rail body 31 and the second rail body 32 on which the transport vehicle 11 travels can be made seamlessly continuous in the travel direction X. Accordingly, this configuration can be preferably used for the transport facility 10 that transport the transport article W that needs to be transported with few vibrations, e.g., a precision device or the like, for example. Further, since the travel faces 35 are continuous, it is possible to restrain abrasion of the transport vehicle 11, thereby making it possible to restrain the environment in a building where the transport facility 10 is provided from being worsened by wear debris, for example.

Other Embodiments

Next will be described other embodiments of the transport facility 10.

(1) The above embodiment has described, as an example, the configuration in which the first rail body 31 and the second rail body 32 are arranged in the horizontal direction. However, the present invention is not limited to such an example, and the first rail body 31 and the second rail body 32 may be arranged to be inclined from the horizontal direction, for example.

(2) The above embodiment has described, as an example, the configuration in which the fire door 40 and the auxiliary door 50 are supported by the wall 20. However, the present invention is not limited to such an example, and the fire door

40 may be supported by the guide rail 30, for example. For example, the auxiliary door 50 may be supported by the guide rail 30 and the fire door 40.

(3) The above embodiment has described, as an example, the configuration in which the transport facility 10 includes the auxiliary door 50 configured to close the opening 21 together with the fire door 40. However, the present invention is not limited to such an example, and the transport facility 10 may not include the auxiliary door 50, for example. For example, the auxiliary door 50 may swing around the swing axis C1 disposed along the up-down direction Z, or the auxiliary door 50 may move downward along the wall surface of the wall 20 to change from the open posture P21 to the closed posture P22.

(4) The above embodiment has described, as an example, the configuration in which a part where the groove 33 is formed in each of the first rail body 31 and the second rail body 32 is made of a material having a heat-resisting property higher than those of other parts of the first rail body 31 and the second rail body 32. However, the present invention is not limited to such an example, and the part where the groove 33 is formed may be made of a material having the same heat-resisting property as those of the other parts, for example. For example, the first rail body 31 and the second rail body 32 may not include the grooves 33. For example, the first rail body 31 and the second rail body 32 may be cut with a section along the up-down direction Z such that the travel faces 35 are discontinuous across the grooves 33 or the fire door 40 in the travel direction X.

(5) The above embodiment has described, as an example, the configuration in which the notch 45 is formed in a band shape parallel to the arrangement direction Y. However, the present invention is not limited to such an example, and the notch 45 may be formed in a semicircular and elliptical shape, for example. For example, the width of the notch 45 in the up-down direction Z may be set to be larger than the width of the guide rail 30 in the up-down direction Z.

(6) The above embodiment has described, as an example, the configuration in which the heat insulation material 70 that expands by heat of fire is attached to at least one of the guide rail 30, the fire door 40, and the auxiliary door 50. However, the present invention is not limited to such an example, and the heat insulation material 70 may not be attached to the guide rail 30, the fire door 40, or the auxiliary door 50, for example.

(7) The above embodiment has described, as an example, the configuration in which the transport facility 10 includes the roller mechanism 37 and the plunger mechanism 47. However, the present invention is not limited to such an example, and the transport facility 10 may not include the roller mechanism 37 and the plunger mechanism 47, for example. For example, the plunger mechanism 47 may press the fire door 40 by the plunger 47*a* from either side in the travel direction X.

(8) The above embodiment has described, as an example, the configuration in which the transport facility 10 includes the first driving device 61 and the second driving device 62. However, the present invention is not limited to such an example. For example, the transport facility 10 may not include the first driving device 61 and the second driving device 62, and the fire door 40 and the auxiliary door 50 may be closed by gravity or the like at the time of power outage. For example, the first driving device 61 may be a device for opening and closing the fire door 40, and the second driving device 62 may be a device for opening and closing the auxiliary door 50.

(9) Note that the configurations disclosed in the above embodiment can be applied in combination with the configurations disclosed in other embodiments as long as no inconsistency occurs. In terms of other configurations, the embodiment disclosed in the present specification is also just an example in all respects. Accordingly, various modifications can be made appropriately as far as it does not deviate from the scope of this disclosure.

The following describes the transport facility according to this disclosure.

A transport facility according to this disclosure is a transport facility including a guide rail which is disposed along a travel path extending in a travel direction through an opening of a wall and which is configured to guide traveling of a transport vehicle, and a fire door configured to open and close the opening. The guide rail includes a first rail body and a second rail body away from each other horizontally in an arrangement direction. The fire door is configured to, in closing the opening, move toward a first side in the arrangement direction along a wall surface of the wall from an open position, at which the opening is opened, to a closed position, at which the fire door closes the opening. The fire door includes: an upper closing section configured to close a region of the opening above the first rail body and the second rail body while the fire door is at the closed position; a lower closing section configured to close a region of the opening below the first rail body and the second rail body while the fire door is at the closed position; a connecting section disposed on a second side in the arrangement direction relative to the first rail body and the second rail body and configured to connect the upper closing section with the lower closing section in an up-down direction; and a notch defined by the upper closing section, the lower closing section, and the connecting section. The notch penetrates the fire door in the travel direction and is open on the first side to prevent the fire door from coming into contact with the first rail body and the second rail body while the fire door is moving from the open position to the closed position.

In this configuration, in a case where the guide rail includes the first rail body and the second rail body away from each other in the horizontal direction, while the fire door is disposed at the closed position, regions above and below the first rail body and the second rail body and a region on the second side relative to the first rail body and the second rail body can be closed by the fire door. Further, travel faces of the first rail body and the second rail body on which the transport vehicle travels can be seamlessly continuous in the travel direction. This accordingly easily restrains vibrations of the transport vehicle at the time when the transport vehicle travels. Further, since the notch of the fire door is opened on the first side to prevent the fire door from coming into contact with the first rail body and the second rail body while the fire door is moving, the fire door can be closed suitably. Further, since the fire door is configured to move in the arrangement direction of the first rail body and the second rail body along the wall surface of the wall, it is possible to avoid the first rail body and the second rail body from coming into contact with the fire door and to easily reduce the width of the notch in a direction perpendicular to the moving direction of the fire door. Thus, it is possible to reduce a gap between the fire door and the guide rail.

As one aspect, it is preferable that: the first rail body and the second rail body have respective top faces as travel faces on which a wheel of the transport vehicle travel; the first rail body and the second rail body overlap with the fire door at the closed position as viewed in the up-down direction; in respective regions where the first and second rail bodies overlap the fire door at the closed position, the first and the second rail bodies include respective grooves extending in the arrangement direction and opened downward below the travel faces, and the lower closing section be partially in the grooves while the fire door is at the closed position.

In this configuration, since part of the lower closing section can be disposed at a position where the part overlaps with the first rail body and the second rail body in a view along the travel direction, the width, in the up-down direction, of the notch of the fire door can be easily reduced. This accordingly makes it possible to further reduce the gap between the fire door and the guide rail.

As one aspect, it is preferable that: the notch be in a band shape parallel to the arrangement direction; and the notch have a width in the up-down direction which width is larger than a distance, in the up-down direction, between the top faces of the first rail body and the second rail body and ceiling faces of the grooves but is smaller than a distance, in the up-down direction, between the top faces of the first rail body and the second rail body and lower faces of the first rail body and the second rail body.

With this configuration, the width, in the up-down direction, of the notch of the fire door can be easily reduced to a minimum. Thus, it is possible to reduce the gap between the fire door and the guide rail.

As one aspect, it is preferable that respective parts where the grooves are formed in the first rail body and the second rail body are made of a material having a heat-resisting property higher than heat-resisting properties of other parts of the first rail body and the second rail body.

The respective parts where the grooves are formed in the first rail body and the second rail body have a small thickness in the up-down direction. Accordingly, in a case where the whole rail body is made of the same material, the parts where the grooves are formed easily melt due to heat of fire at an early stage. In this configuration, since the parts where the grooves are formed are made of a material having a heat-resisting property higher than those of other parts, it is possible to easily avoid the parts where the grooves are formed from melting due to heat of fire at an early stage.

As one aspect, it is preferable that: the transport facility further include an auxiliary door configured to close the opening together with the fire door; and the auxiliary door is configured to move in a direction different from a direction in which the fire door moves and to change from an open posture to a closed posture such that the auxiliary door in the closed posture closes a region of the notch between the first rail body and the second rail body in the arrangement direction.

With this configuration, the auxiliary door can close the region of the notch of the fire door between the first rail body and the second rail body in the arrangement direction, so that it is possible to reduce the gap between the fire door and the guide rail.

As one aspect, it is preferable that: the auxiliary door is configured to swing around a swing axis disposed along the wall surface of the wall and the arrangement direction; and the open posture is a posture of the auxiliary door along the travel direction, and the closed posture is a posture of the auxiliary door along the wall surface of the wall.

With this configuration, it is possible to appropriately achieve a configuration in which the auxiliary door in the open posture is hard to hinder traveling of the transport vehicle, and the auxiliary door in the closed posture can close the region of the notch of the fire door between the first rail body and the second rail body in the arrangement direction.

As one aspect, it is preferable that: a heat insulation material that expands by heat of fire be attached to at least one of the guide rail, the fire door, and the auxiliary door; and the heat insulation material is configured to stop at least one of a gap between the fire door and the guide rail, a gap between the fire door and the auxiliary door, and a gap between the auxiliary door and the guide rail in response to expansion of the heat insulation material.

With this configuration, even in a case where gaps are formed between the fire door and the guide rail, between the fire door and the auxiliary door, and between the auxiliary door and the guide rail, at least some of these gaps can be stopped with the heat insulation material that expands by heat of fire. This makes it possible to increase a fire prevention function.

What is claimed is:

1. A transport facility, comprising:

a guide rail which is disposed along a travel path extending in a travel direction through an opening of a wall and which is configured to guide traveling of a transport vehicle; and a fire door configured to open and close the opening, and wherein:

the guide rail comprises a first rail body and a second rail body away from each other horizontally in an arrangement direction, the fire door is configured to, in closing the opening, move toward a first side in the arrangement direction along a wall surface of the wall from an open position, at which the opening is opened, to a closed position, at which the fire door closes the opening, the fire door comprises:

an upper closing section configured to close a region of the opening above the first rail body and the second rail body while the fire door is at the closed position;

a lower closing section configured to close a region of the opening below the first rail body and the second rail body while the fire door is at the closed position;

a connecting section disposed on a second side in the arrangement direction relative to the first rail body and the second rail body and configured to connect the upper closing section with the lower closing section in an up-down direction; and a notch defined by the upper closing section, the lower closing section, and the connecting section, the notch penetrating the fire door in the travel direction and open on the first side prevents the fire door from coming into contact with the first rail body and the second rail body while the fire door is moving from the open position to the closed position.

2. The transport facility according to claim 1, wherein:

the first rail body and the second rail body have respective top faces as travel faces on which a wheel of the transport vehicle travel, the first rail body and the second rail body overlap with the fire door at the closed position as viewed in the up-down direction, in respective regions where the first and second rail bodies overlap the fire door at the closed position, the first and the second rail bodies comprise respective grooves extending in the arrangement direction and opened downward below the travel faces, and the lower closing section is partially in the grooves while the fire door is at the closed position.

3. The transport facility according to claim 2, wherein:

the notch is in a band shape parallel to the arrangement direction, and the notch has a width in the up-down direction which width is larger than a distance, in the up-down direction, between the top faces of the first rail body and the second rail body and ceiling faces of the grooves but is smaller than a distance, in the up-down direction, between the top faces of the first rail body and the second rail body and lower faces of the first rail body and the second rail body.

4. The transport facility according to claim 2, wherein:

respective parts where the grooves are formed in the first rail body and the second rail body are made of a material having a heat-resisting property higher than heat-resisting properties of other parts of the first rail body and the second rail body.

5. The transport facility according to claim 1, further comprising:

an auxiliary door configured to close the opening together with the fire door, and wherein the auxiliary door is configured to move in a direction different from a direction in which the fire door moves and to change from an open posture to a closed posture such that the auxiliary door in the closed posture closes a region of the notch between the first rail body and the second rail body in the arrangement direction.

6. The transport facility according to claim 5, wherein:

the auxiliary door is configured to swing around a swing axis disposed along the wall surface of the wall and the arrangement direction, and the open posture is a posture of the auxiliary door along the travel direction, and the closed posture is a posture of the auxiliary door along the wall surface of the wall.

7. The transport facility according to claim 5, wherein:

a heat insulation material that expands by heat of fire is attached to at least one of the guide rail, the fire door, and the auxiliary door, and the heat insulation material is configured to stop at least one of a gap between the fire door and the guide rail, a gap between the fire door and the auxiliary door, and a gap between the auxiliary door and the guide rail in response to expansion of the heat insulation material.

* * * * *